Sept. 22, 1925.
W. H. CARRIER
HUMIDITY AND TEMPERATURE REGULATOR
Filed Aug. 6, 1908
1,554,784
3 Sheets-Sheet 1
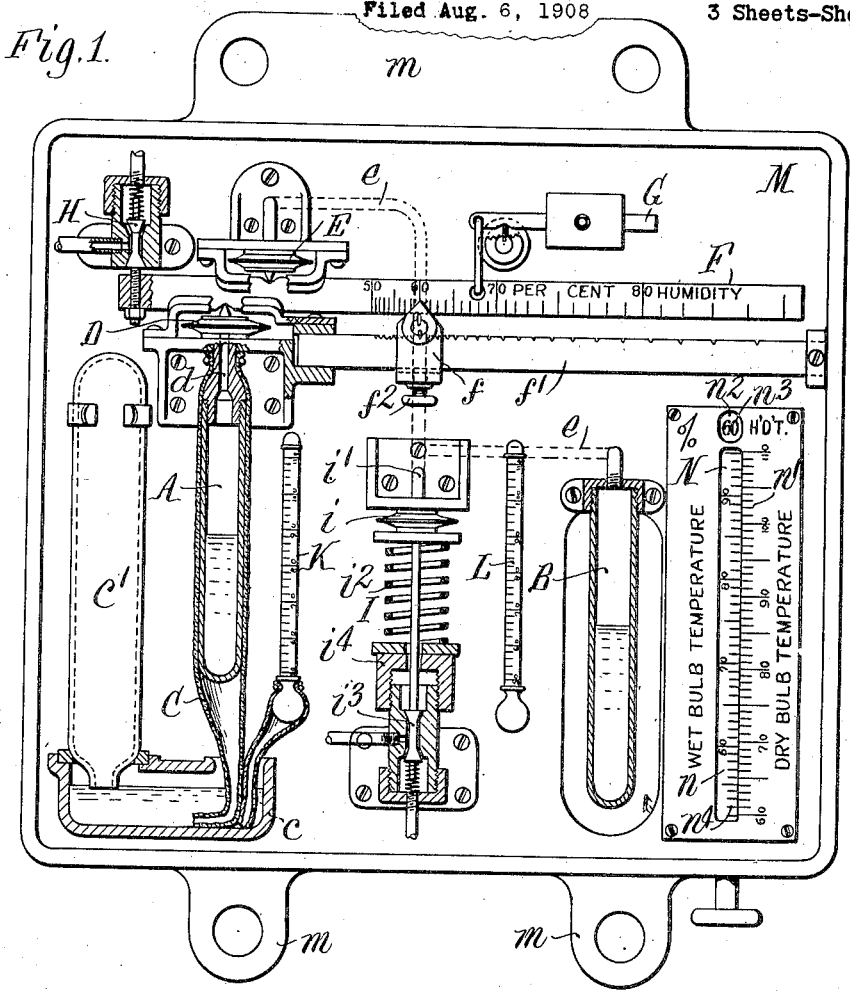
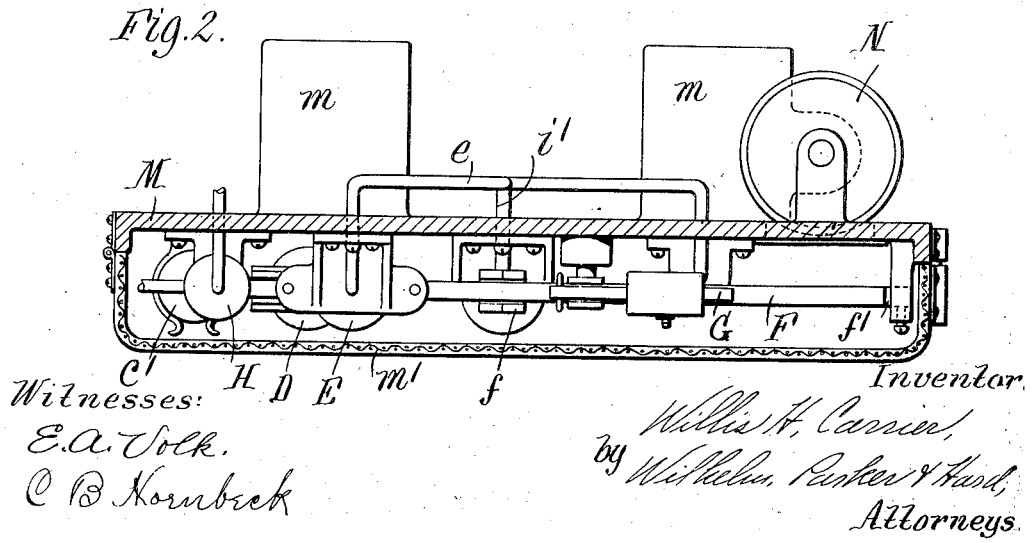

Sept. 22, 1925.  
W. H. CARRIER  
HUMIDITY AND TEMPERATURE REGULATOR  
Filed Aug. 6, 1908
1,554,784
3 Sheets-Sheet 2
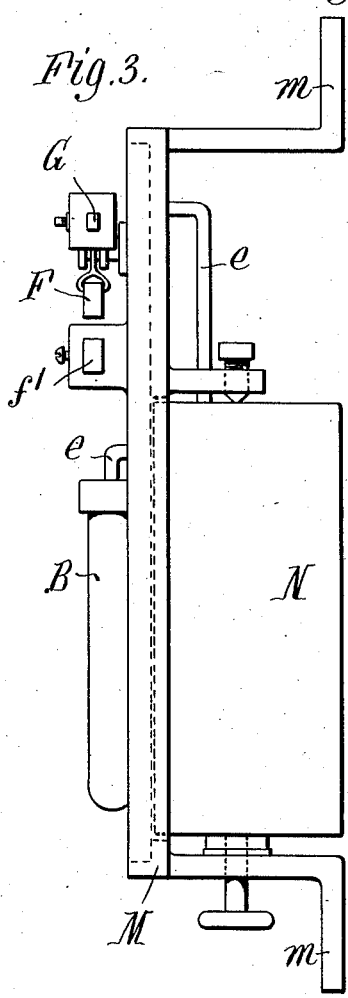
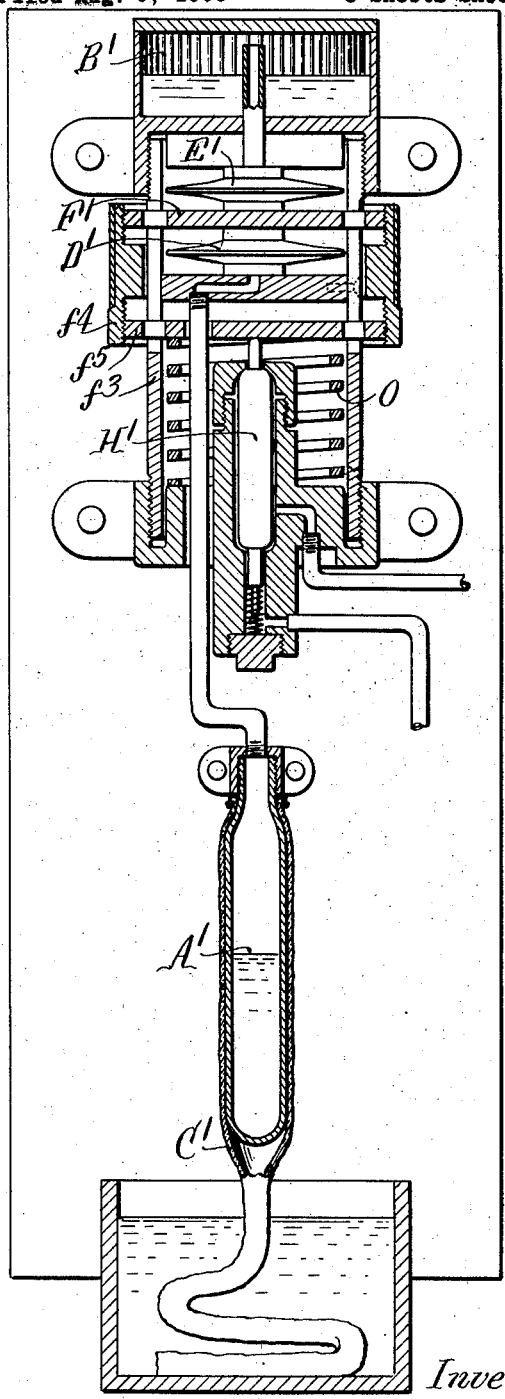

Sept. 22, 1925.

W. H. CARRIER

HUMIDITY AND TEMPERATURE REGULATOR

Filed Aug. 6, 1908   3 Sheets-Sheet 3

1,554,784

Witnesses,
C. H. Band.
F. E. Prochnow.

Inventor,
Willis H. Carrier
Wilhelm, Parker & Hand
Attorneys.

Patented Sept. 22, 1925.

1,554,784

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

HUMIDITY AND TEMPERATURE REGULATOR.

Application filed August 6, 1908. Serial No. 447,240.

*To all whom it may concern:*

Be it known that I, WILLIS H. CARRIER, a citizen of the United States, residing at Buffalo, in the county of Erie and State of New York, have invented a new and useful Improvement in Humidity and Temperature Regulators, of which the following is a specification.

This invention relates to automatic regulating devices for controlling the humidity and temperature of air in textile mills and other places where definite conditions of humidity are essential or desirable.

The primary object of the invention is to produce an efficient and practical instrument in which the pressure of the vapor generated by a volatile liquid is made use of for controlling the humidity of the air, and which will work equally well without adjustment in variable temperatures. Other objects of the invention are to provide the instrument with means whereby, if desired, the temperature of the air as well as its humidity can be regulated; also to make the instrument adjustable for obtaining the different desired hygrometric conditions of the air; and also to improve regulating instruments of the character mentioned in the respects hereinafter described and set forth in the claims.

In the accompanying drawings, consisting of three sheets:

Fig. 1 is a front elevation of a humidity and temperature regulating device embodying the invention, the cover for the support being removed.

Fig. 2 is a sectional plan thereof.

Fig. 3 is a side elevation thereof, the cover for the support being removed.

Fig. 4 is a sectional elevation of a modification.

Like reference characters refer to like parts in the several figures.

Figure 5:
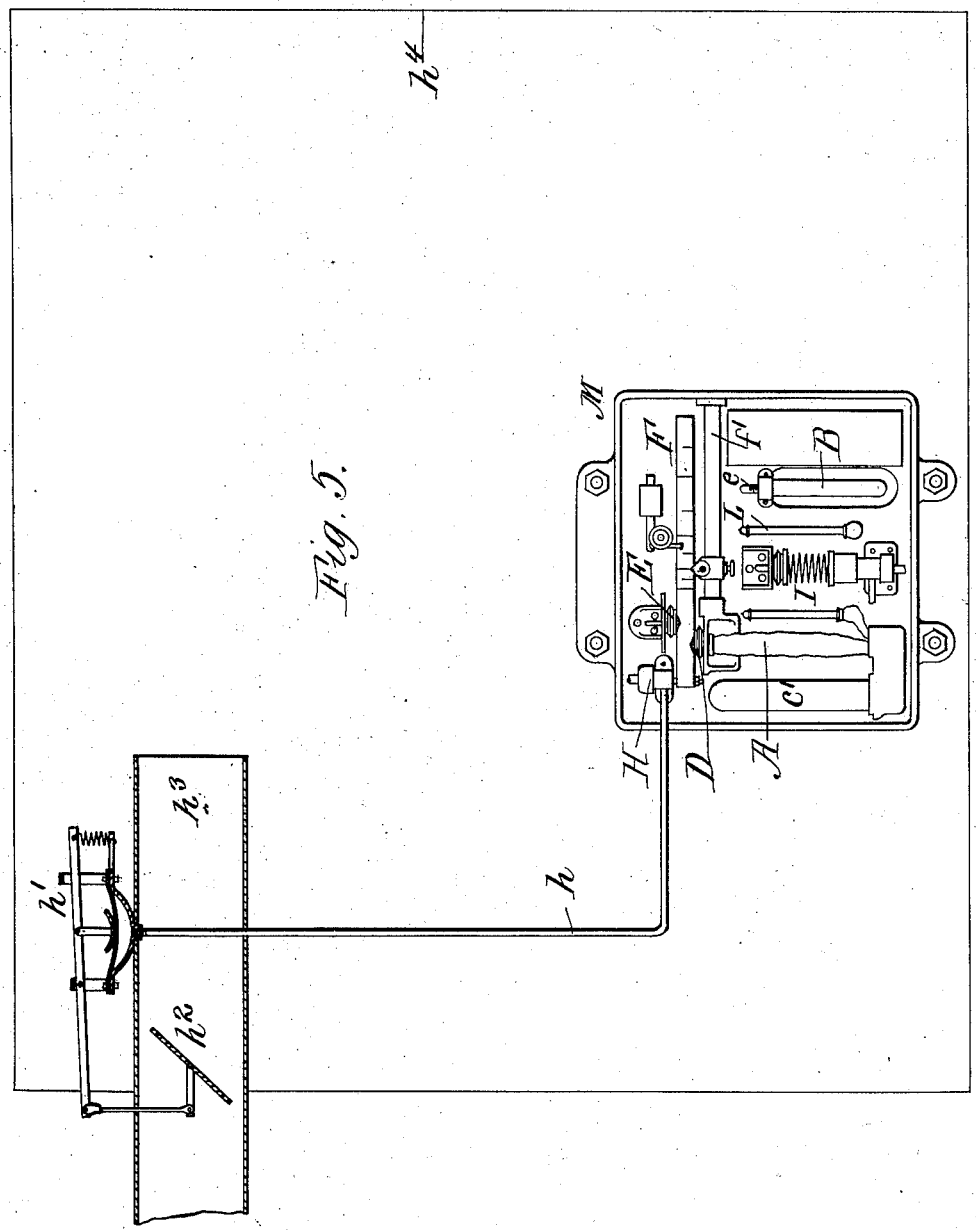
Fig. 5 is a diagrammatic view of humidity controlling means governed by the regulating device.

Two slightly different forms of the instrument embodying the invention are herein shown and described which are adapted to produce different regulating effects.

Referring first to the instrument shown in Figs. 1–3, A and B represent two generator tubes, or receptacles, each partly filled with some suitable volatile liquid whose vapor pressure varies readily in response to changes of temperature. Sulfur dioxide is preferably used as it has an ideal pressure temperature relation for controlling humidity at variable temperatures. As the generator tubes are only partially filled with the liquid, each has an evaporating and a condensing surface, so that any change in temperature affecting the tube will produce an immediate corresponding change in the vapor pressure in the tube. The tubes can, if desired, be corrugated or ribbed for enlarging their radiating surfaces to increase the rapidity of heat exchange and render them more sensitive.

Means are provided for enveloping one of the generator tubes with evaporating moisture so the temperature of this tube always corresponds to that of the wet bulb thermometer and is lower than the temperature of the other tube B, which causes differential pressures in the vapor generated in the two tubes. In the construction shown, the tube A is covered by a wick C which dips into a well $c$ to which water is supplied for wetting the wick by an inverted receptacle $c'$ whose discharge opening depends into the well so as to maintain the water at a constant level therein in a well known manner. Any other suitable means for causing the temperature of the generator tube A to correspond to that of the wet bulb thermometer could be employed.

D and E represent two diaphragms or motors of any suitable construction which are connected by pipes or passages $d$ and $e$, respectively, with the generating tubes A and B, so that the diaphragms or motors will be subject to the differential pressures of the vapor generated in the tubes A and B to which they are connected. The motors D and E are arranged to operate in opposition to each other on a lever or device in such manner that unless the differential pressures of the motors on the lever or device bear a predetermined relation, the lever or device will be moved in one or another direction, depending upon whether the ratio of pressures increases or decreases. The lever or device controls means for regulating the humidity of air, and adjusting means are preferably provided for changing the ratio of the pressures of the motors on the lever or device for producing different regulating effects.

In the construction shown in Figs. 1–3, the movable parts of the motors D and E bear against opposite sides of a lever F at different distances from its fulcrum, and a fulcrum block $f$ for the lever is employed which is slidably mounted on a stationary supporting bar $f'$ below the lever and is provided with a set screw $f^2$ for securing it in different positions on the bar.

A weighted lever G is connected to the regulating lever to counterbalance the weight thereof.

The regulating lever F can be employed for controlling the humidity through the instrumentality of any apparatus or devices capable of performing the required results. For instance, the lever actuates a valve H of ordinary construction in a pipe $h$ for admitting compressed air to and releasing it from the operating diaphragm or motor $h'$ of a valve, damper or other controlling device $h^2$ of a humidifying or humidity regulating apparatus, see Fig. 5. As shown in this figure, the valve $h^2$ controls the supply of humidified air through a pipe $h^3$ to a room $h^4$, thus regulating the humidity in the room.

The invention is not concerned with the construction of the humidifying or humidity controlling apparatus and various other means for this purpose controlled by the regulating lever F can be employed.

The vapor pressures in the motors D and E correspond respectively to the wet and dry bulb temperatures of the atmosphere, and it has been found that these pressures bear an almost exactly constant ratio for a given percentage of humidity for all temperatures between 50° and 100° F. so that a desired percentage of humidity can be secured by adjusting the fulcrum block $f$ to give the necessary ratio between the pressures of the motors D and E acting on the lever, and no adjustment is required for variations in temperature between 50° and 100°. The lever F is preferably graduated and provided with characters indicating different percentages of humidity, and to obtain any desired percentage of humidity within the range of the instrument it is only necessary to set the fulcrum block opposite to the mark on the lever indicating this percentage. No other adjustment of the instrument is required.

I represents a thermostat with which the instrument is preferably equipped for controlling the temperature of the air in cold weather. It consists of a diaphragm or motor $i$ connected by a pipe or passage $i'$ to the generator tube B and operated by the vapor pressure produced therein, a spring $i^2$ which opposes the pressure of the motor I, and a valve $i^3$ which is actuated by the motor and controls the flow of compressed air to and from means (not shown) for governing the temperature. $i^4$ is an adjusting screw by which the tension of the spring $i^2$ can be changed for maintaining a desired temperature. The instrument can be provided with a thermostat or not, as desired, and a thermostat of any suitable construction operated by the vapor pressure can be used.

K and L represent ordinary wet and dry bulb thermometers which may be used or not as preferred.

The several operative parts of the instrument in the construction shown are mounted on a base plate or board M of suitable insulating or non-conducting material provided with brackets $m$ for securing it on a support, and are enclosed and protected by a cover $m'$ hinged or otherwise movably connected to the base plate. The parts of the instrument could, however, be supported and protected in any other desired way.

N represents a cylinder which is mounted to turn in rear of a slot $n$ in the base plate M. The plate is provided along one edge of the slot with a scale $n'$ indicating dry bulb temperatures and the surface of the cylinder is provided opposite to a hole $n^2$ in the base plate M with figures $n^3$ representing different percentages of humidity, and also with scales $n^4$ indicating wet bulb temperatures, which are so arranged that when the cylinder is turned to expose the figure representing a desired percentage of humidity, the wet bulb scale exposed through the slot $n$ read in connection with the adjacent dry bulb scale $n'$ will indicate the proper relation of the wet and dry bulb temperatures for that percentage of humidity. A mechanical hygrometric chart is thus provided which is desirable in connection with the regulating instrument, but the invention is not restricted to the described construction of the chart, nor, in fact, to the use of any chart.

With the vapor pressures acting differentially on the regulating device as above described, the instrument is adapted for maintaining a constant relative humidity of the air notwithstanding fluctuations in the temperature thereof.

In Fig. 4 the instrument is constructed so that the vapor pressures produced by the wet and dry bulb temperatures act in direct opposition on the regulating device, thereby adapting the instrument to maintain a constant difference between the wet and dry bulb temperatures, which gives a varying relative humidity with fluctuations in temperature. In said Fig. 4, A' represents the vapor generating tube surrounded by the wetted wick C'; B' the other generating tube, and D' and E' the diaphragms or motors connected respectively to the generating tubes A' and B'. The motors act in opposition on a regulating disk or device F' which slides in a slotted stationary tube $f^3$ and has a threaded engagement with an adjusting screw $f^4$ which has a threaded engagement of opposite pitch with a second disk $f^5$ also arranged to slide in the slotted tube $f^3$. H′ represents the valve for governing the flow of compressed air to and from the humidity controlling means (not shown).

A spring O arranged in the slotted tube $f^3$ opposes the movement of the regulating disk F′ by the motor E′, and the tension of this spring can be altered to obtain various constant differences between the wet and dry bulb temperatures by adjusting the screw $f^4$.

So long as the pressure of the motor E′ balances that of the other motor D′ and spring O, the position of the valve H′ will not be affected, but unbalanced pressures acting on the regulating device F′ will effect a regulating action of the valve so as to maintain the desired constant difference between the wet and dry bulb temperatures of the air.

It will be apparent from the two forms of the instrument described that the invention is not restricted to any particular construction of the means for utilizing the differential pressures produced by the vapor generated from separate bodies of volatile liquid separately influenced by different temperatures. In both embodiments of the invention described, the regulation is dependent upon the relation existing between the wet and dry bulb temperatures of the atmosphere and each construction is more particularly intended for producing the definite effect stated, but different regulating effects can be obtained by securing a proper relative action between the different pressures of the vapor, and furthermore, the invention is not restricted to devices whose action is dependent upon the wet and dry bulb temperatures of the atmosphere, but it is applicable to regulating devices in which the vapor generators are independently influenced by different temperatures however produced.

I claim as my invention:

1. In a humidity regulator, the combination with a humidity supply system, and a valve operable to control the action of said system; of a rocking lever for effecting the operation of the valve, and thermo-responsive elements independently influenced by different temperatures, and connected to the lever at points unequally separated lengthwise of the lever from the pivotal axis of said lever, the movement of the lever being dependent upon the relation existing between said different temperatures, substantially as set forth.

2. In a humidity regulator, the combination with a humidity supply system, and a valve operable to control the action of said system; of a rocking lever for effecting the operation of the valve, and vapor generators independently influenced by the wet and dry bulb temperatures of the air, and acting in opposition upon the lever at points unequally separated lengthwise of the lever from the pivotal axis of said lever, the movement of the lever being dependent upon the relation existing between said wet and dry bulb temperatures.

3. In a humidity regulator, the combination with a humidity supply system, and a valve operable to control the action of said system; of a rocking lever for effecting the operation of the valve; thermo-responsive elements independently influenced by different temperatures and connected to the lever at points unequally separated lengthwise of the lever from the pivotal axis of said lever, the movement of the lever being dependent upon the relation existing between said different temperatures, and means for adjusting said pivotal axis lengthwise of the lever, substantially as set forth.

4. In a humidity regulator, the combination with a humidity supply system, and a valve operable to control the action of said system; of a rocking lever for effecting the operation of the valve, vapor generators independently influenced by the wet and dry bulb temperatures of the air, and acting in opposition upon the lever at points unequally separated lengthwise of the lever from the pivotal axis of said lever, the movement of the lever being dependent upon the relation existing between said wet and dry bulb temperatures, and means for adjusting said pivotal axis lengthwise of the lever, substantially as set forth.

5. In a humidity regulator, the combination with a humidity supply system, and a valve operable to control the action of said system; of a rocking lever for effecting the operation of the valve, vapor generators, partly filled with sulphur dioxide, and independently influenced by the wet and dry bulb temperatures of the air, the generators acting in opposition upon the lever at points unequally separated lengthwise of the lever from the pivotal axis of said lever, and the movement of the lever being dependent upon the relation existing between said wet and dry bulb temperatures, and means for adjusting said pivotal axis lengthwise of the lever, substantially as set forth.

6. In a humidity regulator, the combination with a humidity supply system, and a valve operable to control the action of said system; of a rocking lever for effecting the operation of the valve, the lever being provided with a lengthwise series of graduations indicating the percentages of humidity to be maintained by the regulator, thermo-responsive elements independently influenced by different temperatures and connected to the lever at points unequally separated lengthwise of the lever from the pivotal axis of said lever, the movement of the lever being dependent upon the relation existing between said different temperatures, and means for adjusting said pivotal axis lengthwise of the graduations on the lever, substantially as set forth.

7. In a humidity regulator, the combination with a humidity supply system, and a valve operable to control the action of said system; of a rocking lever rigidly connected to the valve for effecting the operation of the valve, and vapor generators independently influenced by the wet and dry bulb temperatures of the air and yieldingly acting in opposition upon the lever at points unequally separated lengthwise of the lever from the pivotal axis of said lever, the movement of the lever being dependent upon the relation existing between said wet and dry bulb temperatures, substantially as set forth.

Witness my hand, 4th this day of August, 1908.

WILLIS H. CARRIER.